United States Patent
Sakaue

(10) Patent No.: US 8,417,028 B2
(45) Date of Patent: Apr. 9, 2013

(54) APPARATUS FOR AUTOMATICALLY DETERMINING COLOR/MONOCHROME OF DOCUMENT IMAGE, METHOD OF CONTROLLING SAME, PROGRAM OF SAME AND IMAGE PROCESSING APPARATUS WITH SAME

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 12/874,032

(22) Filed: Sep. 1, 2010

(65) Prior Publication Data

US 2011/0081076 A1    Apr. 7, 2011

(30) Foreign Application Priority Data

Oct. 6, 2009  (JP) .................................. 2009-232492

(51) Int. Cl.
*G06K 9/00*       (2006.01)
*G06K 9/34*       (2006.01)

(52) U.S. Cl.
USPC ........................................................ 382/165

(58) Field of Classification Search .................. 382/162, 382/164, 165, 167; 348/374; 358/1.15, 1.18, 358/1.9, 2.1, 406, 504, 521
See application file for complete search history.

(56) References Cited

U.S. PATENT DOCUMENTS

| | | | |
|---|---|---|---|
| 4,819,193 A * | 4/1989 | Imao | 358/521 |
| 7,057,764 B1 | 6/2006 | Sakaue | |
| 7,139,087 B2 * | 11/2006 | Hayashi | 358/1.15 |
| 7,616,360 B2 | 11/2009 | Otake et al. | |
| 8,203,759 B2 * | 6/2012 | Kato | 358/2.1 |
| 2007/0024880 A1 | 2/2007 | Sato et al. | |
| 2007/0046961 A1 | 3/2007 | Kashibuchi et al. | |
| 2010/0033778 A1 | 2/2010 | Otake et al. | |
| 2010/0097656 A1 | 4/2010 | Misawa et al. | |
| 2011/0081076 A1 * | 4/2011 | Sakaue | 382/165 |

* cited by examiner

*Primary Examiner* — Amir Alavi
(74) *Attorney, Agent, or Firm* — Fitzpatrick, Cella, Harper & Scinto

(57) ABSTRACT

Performance of the auto selection processing depends greatly on performance of an image reading apparatus. Since an image processing parameter set by assuming the possible strictest condition is applied to all the image processing apparatuses of the same product kind without variation, there occurs an event that some of the image processing apparatuses do not sufficiently effect the performance of the image reading apparatus. An apparatus of setting a parameter used at the time an image processing apparatus determines whether an image data read by an image reading apparatus is a colored image or a monochrome image, to the image processing apparatus, comprises a unit configured to obtain a reading characteristic of the image reading apparatus, and a parameter setting unit configured to set the parameter corresponding to the obtained reading characteristic.

7 Claims, 15 Drawing Sheets

APPARATUS FOR AUTOMATICALLY DETERMINING COLOR/MONOCHROME OF DOCUMENT IMAGE, METHOD OF CONTROLLING SAME, PROGRAM OF SAME AND IMAGE PROCESSING APPARATUS WITH SAME

BACKGROUND OF THE INVENTION

1. Field of the Invention

The present invention relates to an apparatus for automatically determining color/monochrome of a document image, a method of controlling the apparatus, a program of the apparatus and an image processing apparatus provided with the apparatus.

2. Description of the Related Art

There conventionally exists a Multifunction Peripheral (MET) reading a document with an image reading apparatus (scanner) and provided with an auto color selection (ACS) function of automatically determining whether the obtained document image is a colored document or a monochrome document.

Such MFP is used for an output service of an accounting system in a variety of scenes such as convenience stores or libraries. In such output service, print output is made according to the determination result by the auto color selection function and the accounting is performed corresponding to the print output. For example, in a case where it is determined that the document is a colored document, the print output is made in color to charge 40 yen per sheet and in a case where the document is a monochrome document, the print output is made in monochrome to charge 10 yen per sheet.

However, it is difficult to always perform the automatic determination with high accuracy on whether the document is the monochrome document or the colored document in regard to all products. This is because even if the MFP is provided with the same model number and the same specification, each incorporated scanner has an individual difference and the reading characteristic thereof varies more or less.

That is, a scanner of some MFP can read an image very accurately, but on the other hand, a scanner of the other MFP has a reading performance more than a predetermined level but can not read an image so much accurately.

For preventing variations in performance of the ACS function due to the individual difference of such scanner from being generated between products, an image processing parameter in the ACS function has been standardized so far. That is, even in the MFP equipped with a scanner which can read an image with extremely high accuracy, by performing the parameter setting for restricting the performance, variations in performance between products based upon the individual difference of the scanner are absorbed. In other words, there exist not a few MFP which can not achieve the performance sufficiently although they can effect high ACS performance.

SUMMARY OF THE INVENTION

The present invention relates to an apparatus for setting a parameter used at the time an image processing apparatus determines whether an image data read by an image reading apparatus is a colored image or a monochrome image (gray scale image), to the image processing apparatus, the apparatus comprising a unit configured to obtain a reading characteristic of the image reading apparatus, and a parameter setting unit configured to set the parameter corresponding to the obtained reading characteristic.

According to the present invention, the parameter of the ACS function can be set corresponding to performance of the scanner. Therefore, a user can use the ACS function in a state of maximizing the performance of the scanner in the MFP in use.

Further features of the present invention will become apparent from the following description of exemplary embodiments with reference to the attached drawings.

DESCRIPTION OF THE EMBODIMENTS

Hereinafter, the best mode of carrying out the present invention will be explained with reference to the attached drawings.

(Basic Technology)

Figure 1:
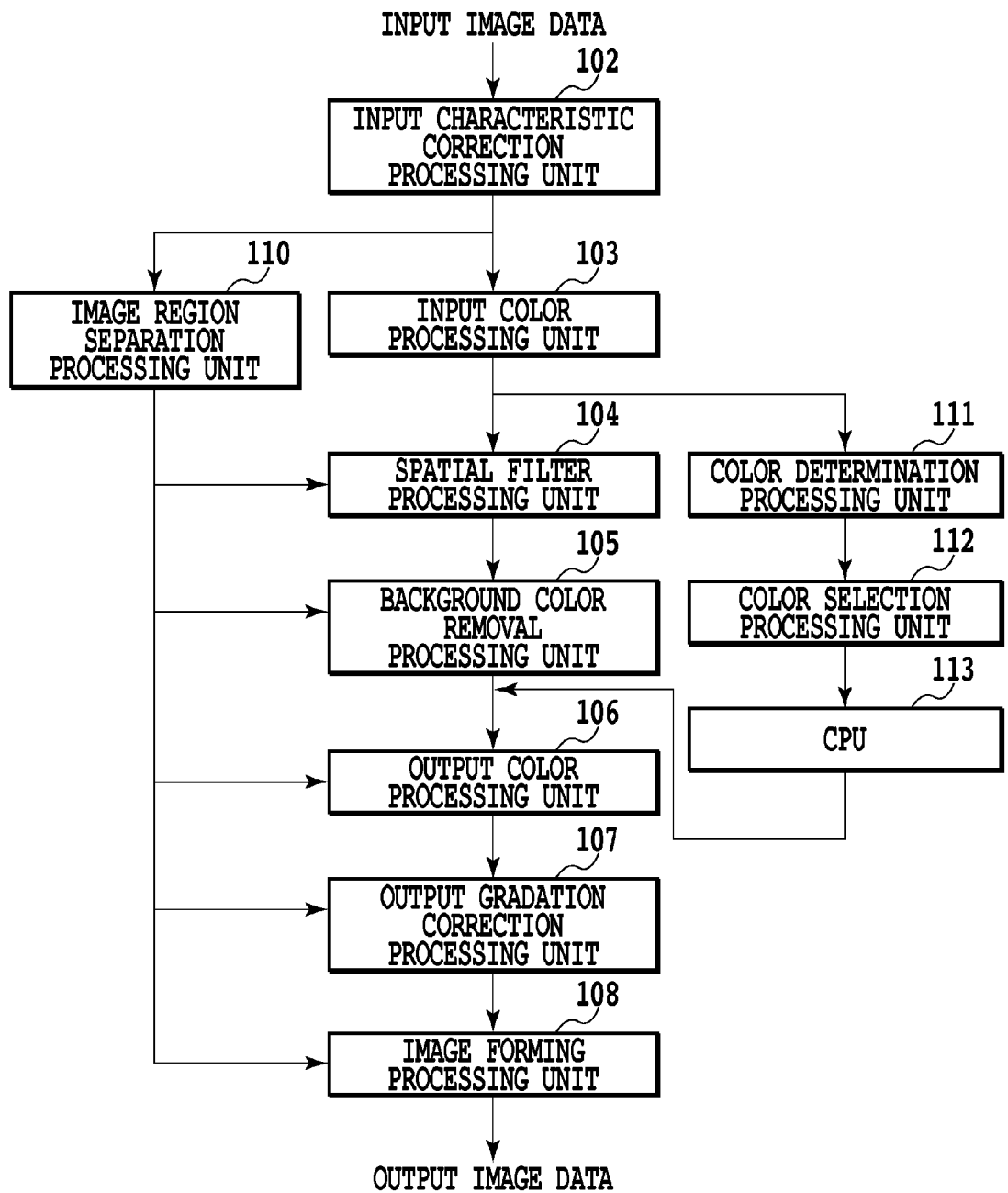
FIG. 1 is a diagram explaining an arrangement of an image processing apparatus according to the present invention.

FIG. 1 is a functional block diagram showing an example of an arrangement in an image processing apparatus (MFP) equipped with a conventional ACS function.

For example, in a case of performing a copy, first, an image data inputted from an image reading apparatus (scanner) (not shown) is inputted to an input characteristic correction processing unit 102. The input characteristic correction processing unit 102 performs correction corresponding to a characteristic of an individual scanner, such as a color deviation between respective channels in a reading device of the scanner, to the image data. The image data corrected at the input characteristic correction processing unit 102 is inputted to an input color processing unit 103 and an image region separation processing unit 110.

The input color processing unit 103 performs various kinds of image processing such as gradation correction and color space conversion processing using the well-known technology. The image data processed at the input color processing unit 103 is inputted respectively to a spatial filter processing unit 104 and a color determination processing unit 111.

The image region separation processing unit 110 generates an attribute signal in an image unit from the corrected image data by using the well-known technology. The attribute signal means a signal for switching processing contents of various kinds of image processing to be described later. The attribute means characters and photographs (non-characters or background portions). Further, there are some cases where the attribute is classified in more detail into characters, halftone dots, background portions and the like. In the present embodiment, for simple explanation, the attribute signal is defined to show characters and photographs. The attribute signal generated at the image region separation processing unit 110 is inputted to the spatial filter processing unit 104, a background color removal processing unit 105, an output color processing unit 106, an output gradation correction processing unit 107 and an image forming processing unit 108.

The spatial filter processing unit 104 switches the spatial filter processing for characters and for photographs in a pixel unit based upon the attribute signal generated at the image region separation processing unit 110 for the performing. The image data processed at the spatial filter processing unit 104 is inputted to the background color removal processing unit 105.

The background color removal processing unit 105 extracts a background portion level of the image data to remove an appropriate level. At this time, the background color level to be removed at a character portion and at a photograph portion is controlled based upon the attribute signal. The image data processed at the background color removal processing unit 105 is inputted to the output color processing unit 106.

The output color processing unit 106 performs color processing for characters and for photographs based upon the attribute signal. In regard to the character portion, importance is placed on reproducibility of characters and, for example, in an image processing apparatus for printing in cyan, magenta, yellow, black and the like, the color processing is performed to print black characters in a single color of black. In reverse, in regard to the photograph portion, the color processing for placing importance on reproducibility of photographs is performed. The image data processed at the output color processing unit 106 is inputted to the output gradation correction processing unit 107.

The output gradation correction processing unit 107 performs the gradation correction processing for characters and photographs respectively to the character portion and the photograph portion based upon the attribute signal. The image data processed at the output gradation correction processing unit 107 is inputted to the image forming processing unit 108.

The image forming processing unit 108 performs the image forming processing for characters and photographs respectively to the character portion and the photograph portion based upon the attribute signal. In regard to the character portion, importance is placed on reproducibility of characters and, for example, error dispersion processing or dither processing of high line numbers is performed. In regard to the photograph portion, importance is placed on reproducibility of smooth and stable gradations in photographs and, the image forming processing such as dither processing of low line numbers is performed.

The image data processed at the image forming processing unit 108 is printed at a printing unit (not shown) for outputting.

In the aforementioned processing, the arrangement of switching parameters for characters and photographs is explained, but the present invention is not limited thereto. For example, the processing for characters and the processing for photographs may be respectively performed to select the processed image data in a pixel unit based upon an attribute signal.

The color determination processing unit 111 determines whether respective pixels of the image data are in a chromatic color or in an achromatic color in a pixel unit in parallel with the above-explained spatial filter processing to generate a color determination signal to be described later. The generated color determination signal is inputted to a color selection processing unit 112.

The color selection processing unit 112 performs the processing of determining whether the image data is a colored image or a monochrome image. This determination result is inputted to a CPU 113 to finally determine whether the image data is the colored document or the monochrome document. The CPU 113 provides the determination result to the output color processing unit 106 and the like. In a case where the image data is the colored document, the output color processing for the colored document is performed, and in a case where the image data is the monochrome document, the output color processing for the monochrome document is performed.

Figure 2:
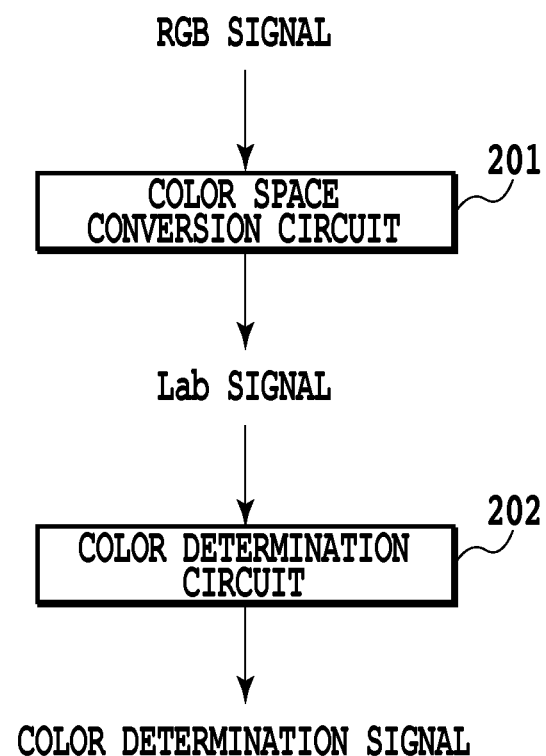
FIG. 2 is a diagram explaining an outline of color determination processing.
Figure 3:
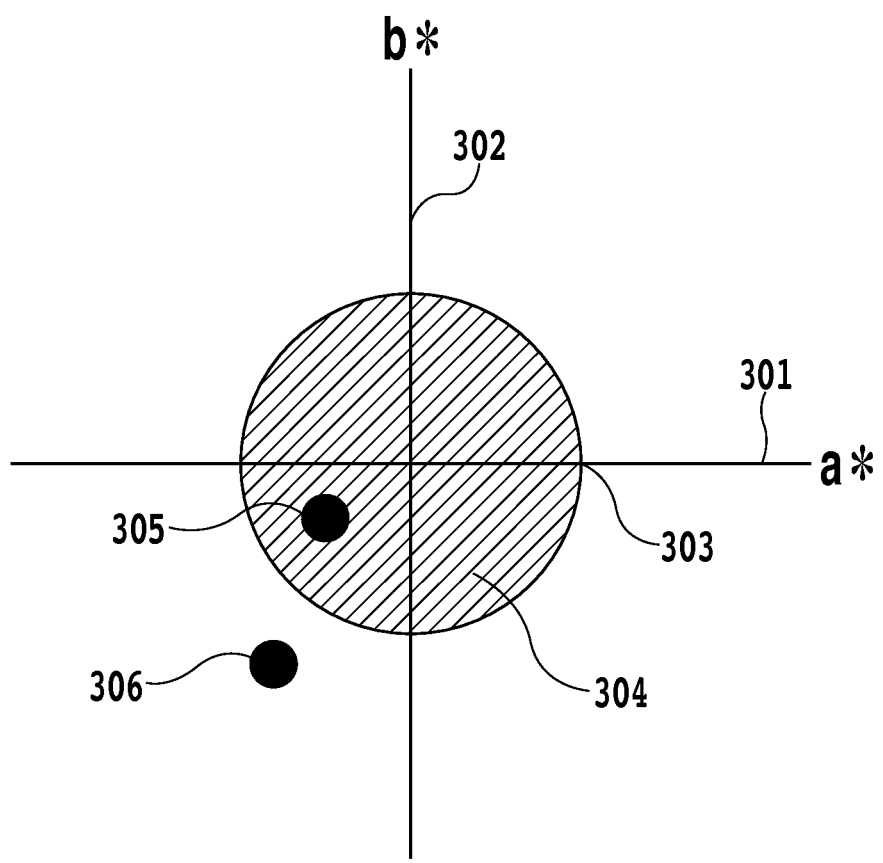
FIG. 3 is a diagram showing an example of a and b values mapped in an orthogonal coordinate system.

Here, a detail of the color determination processing unit 111 will be explained with reference to FIG. 2 and FIG. 3. The color determination processing unit 111 is configured by a color space conversion circuit 201 and a color determination circuit 202. FIG. 2 is a flow chart showing a flow of the processing in the color determination processing unit 111.

First, RGB signals as the image data processed in color at the input color processing unit 103 are inputted to the color space conversion circuit 201.

The color space conversion circuit 201 converts the inputted RGB signal into a Lab signal. Here, "Lab" means a Lab color space and is a color space proposed as an equal perceptual color space by CIE (Commission Internationale de l'Eclairage) in 1976. L denotes luminosity (brightness), a denotes chromaticity from red to green, and b denotes chromaticity from blue to yellow. In the Lab color space, since the image data is corrected in such a manner that a changing amount in the three-dimensional color space is in proportion to an impression of a visual color change caused by the changing, the color determination with high accuracy is possible.

The Lab signal generated at the color space conversion circuit 201 is inputted to the color determination circuit 202. The color determination circuit 202 determines whether each pixel is in a chromatic color or an achromatic color in one pixel unit to output a color determination signal. Specially a and b values of the Lab signal are mapped in an orthogonal coordinate system to determine whether the pixel is in a chromatic color or in an achromatic color to perform the processing of outputting the color determination signal composed of a chromatic color signal and an achromatic color signal. FIG. 3 is a diagram showing an example of a and b values mapped in the orthogonal coordinate system. An a axis 301 and a b axis 302 show respective axes of the orthogonal coordinate system. In determination on whether the pixel is the chromatic color or achromatic color, for example, in a case of using color saturation as a reference, an intersecting point between the a axis and the b axis becomes a zero point of the color amount (original point) in this coordinate system. The color saturation is larger as much as the mapped a and b values are distant from the original point (that is, as values of a and b are the larger).

Whether some pixel is in a chromatic color or in an achromatic color is determined by comparing the mapped a and b values with predetermined values. In FIG. 3, a contour line 303 of a circular hatched region 304 shows an example of a threshold value. In this case, for example, a value expressing a radius r of this circle is set as the threshold value. Here, the radius r is expressed according to the following equation.

$$r^2 = a^2 + b^2 \qquad \text{[Equation 1]}$$

That is, the radius r is provided as a square root of a value found by a square of a plus a square of b. In a case where a and b values of some pixel exist inside the contour line 303 as the threshold value, that is, on the hatched region 304 (point 305), the pixel is determined as an achromatic color and in a case where the a and b values exist outside the contour line 303 (outside the hatched region 304) (point 306), the pixel is determined as a chromatic color.

Here, there is explained a case where the contour line 303 as the threshold value is configured by a perfect circle, but the contour line 303 is not necessarily limited thereto and may be configured in an eclipse shape or in a polygonal shape found by connecting any line segments. In addition, the color space used in the color determination processing unit 111 is explained by taking the Lab space as an example thereof, but is not limited to the Lab space. Another color space may be used to perform the color determination processing or the color space may be replaced by a simple conversion equation. Further, the explained color determination method is simply taken as an example and the other method may be used.

Figure 4A:
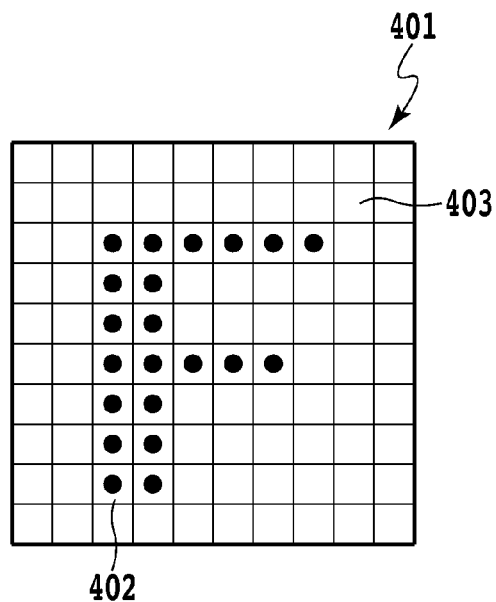
FIGS. 4A-4D are diagrams explaining color selection processing.

Next, a detail of the color selection processing unit 112 will be explained with reference to FIGS. 4A-4D. Number 401 in FIG. 4A is an example of an inputted image data and is composed of a color character 402 expressing an alphabet "F" in a red color and a background region 403 in a white color as a background portion. For example, when such an image data is processed at the color determination processing unit 111, a color determination signal as shown in number 411 is outputted. That is, the color determination signal 911 composed of a chromatic color signal 412 (portion where the color character 402 in red exists) and an achromatic color signal 413 (portion where the background portion 403 in white exists) is generated and outputted. The matching processing is performed to the color determination signal 411 based upon a predetermined condition. Specially a predetermined pattern is matched to the image data to calculate an appearance frequency of a pixel group in a chromatic color for meeting the pattern. The predetermined pattern can be configured by a plurality of pixels to be formed in any shape. Number 421 is an example of a pattern in which it can be determined whether or not six pixels in a chromatic color sequentially exist in a horizontal direction. When the pattern 421 overlaps over the color determination signal 411, the signal 411 changes into a pattern as shown in number 431. As apparent from in FIG. 4B, in regard to the chromatic color signal 412, a case of the pattern 432 is matched to the pattern 421. A case of the pattern 433 or 439 meets a part of the pattern 421, but does not meet all of the six pixels constituting the pattern 421. Therefore, in a case where the matching processing is performed to the chromatic color signal 412 in the color determination signal 411 by using the pattern 421, it is only one time of the pattern 432 that meets the pattern 421. Collection of chromatic color pixels which is determined to meet a predetermined pattern by the matching processing is considered as a chromatic color group, and the calculated appearance frequency of the chromatic color group is notified of the CPU 113 as the determination result.

The CPU 113 determines whether the image data is a colored data or a monochrome data based upon the number of the received appearance times. Specially, for example, the number of the received appearance times is compared with the number of predetermined times, and it is determined whether the image data is the colored data or the monochrome data based upon whether or not the number of the received appearance times reaches the number of the predetermined times. The number of the predetermined times can be set arbitrarily, and when the number of the appearance times is one or more, the image data may be determined to be the colored image or the image data may be determined to be the colored image based upon a condition of the number of plural appearance times. In addition, in the present embodiment, the pattern in which the chromatic colors exist sequentially in a horizontal direction is used as the pattern used for the matching processing, but instead of this, a pattern in which the chromatic colors exist sequentially in a vertical direction may be used. Further, the patterns in both of the horizontal and vertical directions may be used for the determination. In addition, in the matching processing, the number of the appearance times may be set as one in a case where a pattern is generated by plural times on the same line by reducing a size of the pattern to be small. In this case, the number of the lines in which the matching of the pattern occurs by plural times is notified of the CPU 113. In this way, when the configuration or the size of the pattern used in the matching processing and the condition at the time of finally determining the colored image are set as needed, the determination level can be arbitrarily changed.

(Principle of Erroneous Determination and Conventional Measure)

As described above, the color determination processing is performed to each pixel in the inputted image data, it is determined whether the image data is the colored data or the monochrome image, and the processing suitable for the image data is performed.

However, there are some cases where it is determined that the image data which is supposed to be the monochrome document is the colored data in error. Hereinafter, the principle for occurrence of the erroneous determination and the conventional measure against it will be explained.

Figure 5A:
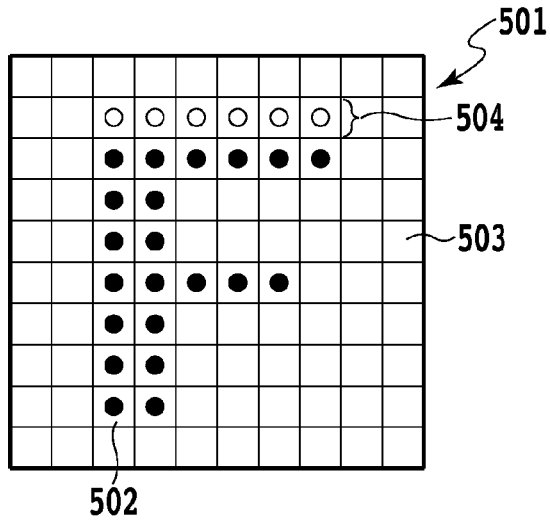
FIGS. 5A-5E are diagrams explaining an erroneous determination in the color selection processing.

Number 501 in FIG. 5A is an example of an image data, which is composed of a black character 502 expressing an alphabet "F", a white background region 503 as a background portion and a color pixel portion 504 generated by a color deviation.

Here, a reading device of the scanner is arranged in a horizontal direction to a document for reading and moves in a vertical direction to read an image. When an accidental vibration is generated at an edge portion in the character 502 during the reading operation, a region accompanied by color blur is generated at the edge portion in the black character. This region accompanied by the color blur is the color pixel portion 504.

When the image 501 containing this color pixel portion 504 is processed at the color determination processing unit 111, a color determination signal as shown in an image 511 is generated. That is, the black character portion 502 and the background portion 503 are achromatic color signals 512 and the color determination signal 511 in which the color pixel portion 509 has changed into a chromatic color signal 514 is generated.

Figure 4C:
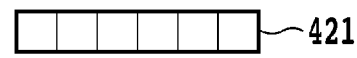
Figure 4B:
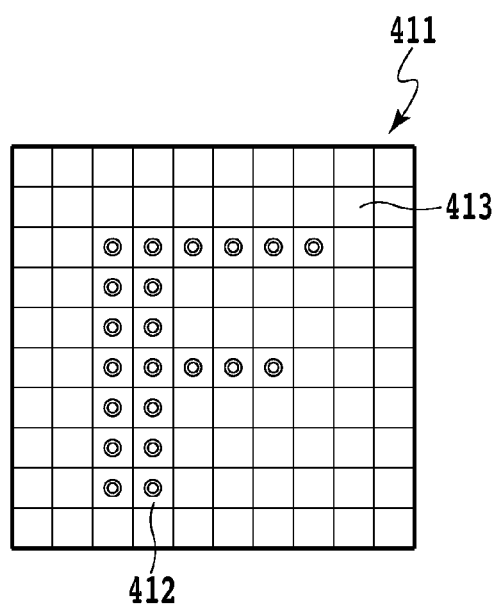
Figure 4D:
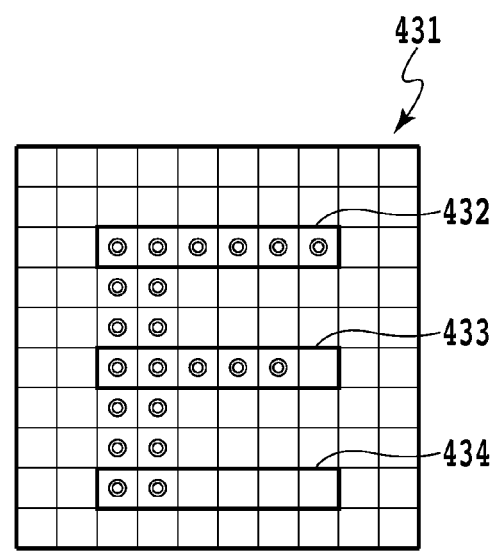

At the color selection processing unit 112, when the matching processing using the pattern 421 in FIG. 4C is performed to the color determination signal 511, the portion of the chromatic color signal 514 results in meeting the pattern 421 as shown in an image 521. As a result, the number of the appearance times of matching the pattern is notified to the CPU 113 as one time. When a reference for determination on the colored image is defined as one or more appearance times, the CPU 113 determines the image data 501 as a colored image.

However, an actual document is a monochrome document in which an alphabet "F" is printed in black on a white base and not a colored document. In this way, it is in error determined that the monochrome document is the colored document due to the color deviation generated at reading.

Therefore, for avoiding this erroneous determination, the following measure is carried out conventionally.

Figure 5D:
Figure 5E:
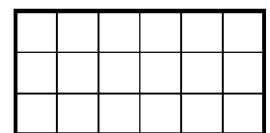
Figure 5B:
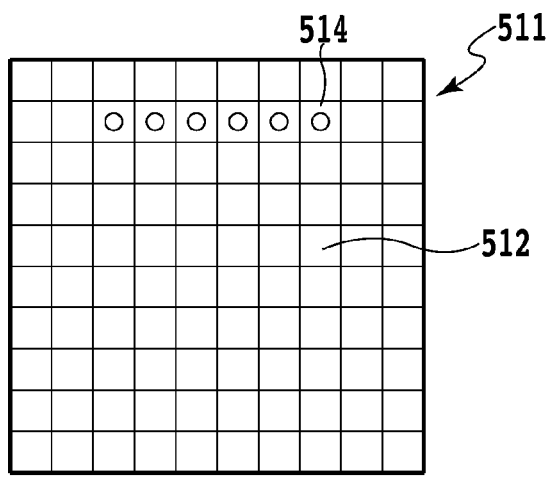
Figure 5C:
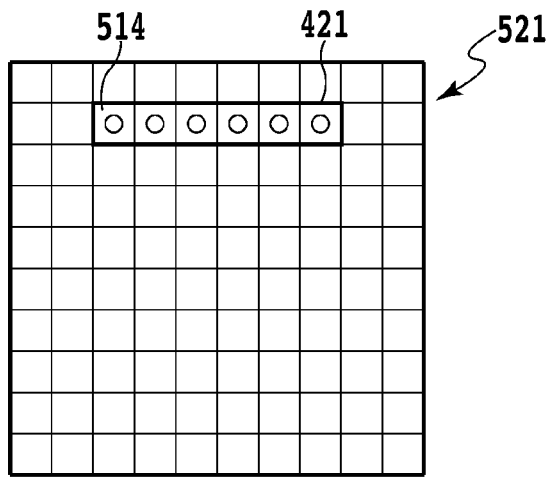

One is to change a parameter for determining a chromatic color used at the color selection processing. For example, the parameter is set by increasing the number of pixels successive in a horizontal direction as shown in a pattern 530 in FIG. 5D or on a condition that plural pixels successive in a horizontal direction are successively generated as plural lines in a vertical direction, which is made more difficult to determine the monochrome image as the colored image. It is possible to restrict the erroneous determination with this method, but on the other hand, there occurs a problem that accuracy of the color selection determination processing to small characters or short line drawings is degraded.

Therefore, there is adopted the measure that color blur (color pixel portion) generated by color deviation is determined as an achromatic color by changing a threshold value of the color determination circuit 202. Hereinafter, the measure will be explained with reference to the drawings.

Figure 6:
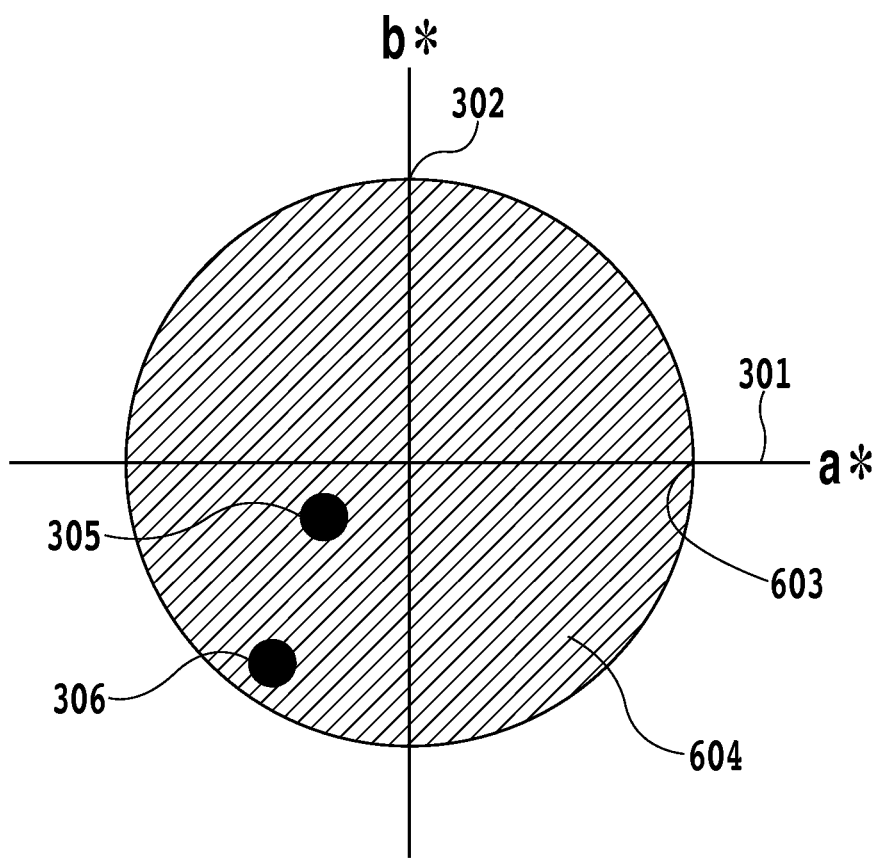
FIG. 6 is a diagram explaining a conventional method of coping with the erroneous determination in the color selection processing.

First, it is assumed that chromaticity in the color pixel portion 504 generated by the color deviation is converted into a Lab space and a and b values are mapped in an orthogonal coordinate system to be in a point 306. In FIG. 3, since the contour line 303 of the circular hatched region 304 shows a threshold value, the a and b values are determined as achromatic color by applying this contour line 303 as it is. Therefore, when the hatched region 403 is expanded as shown in number 604 in FIG. 6 to set a contour line 603 as a threshold value in such a manner that the point 306 is accommodated inside the contour line 603, the color pixel portion 504 is determined as an achromatic color.

The generation of the accidental color deviation depends basically on components constituting the scanner and the assembly accuracy, and in a case of the scanner with an automatic feeding device, is influenced also by a use environment such as a size, strength and weight (basic weight) of a sheet to be carried out. Therefore, considering various conditions causing the color deviation, a threshold value in which resistance properties exist even in a possible strictest condition is set to avoid the erroneous determination.

However, any of the measure methods is a method where the performance of the auto color selection processing is sacrificed in a sense. That is, in the former method, it is impossible to detect a color region in a small size. Since in the latter method, sensibility of the color determination is degraded, there occurs a risk that the colored image is in error determined as the monochrome image.

Accordingly, even if the above measures are adopted, it is desirable to minimize the degree of the sacrifice, but in fact it is not minimized. As described first, for eliminating variations in performance between products, the parameter defined by estimating the possible strictest condition is applied to all the image processing apparatuses of the same product kind without variation. Therefore, as a result, the capability which are supposed to be originally provided to many users can not be provided. Particularly, users using general sheets (sheet having regular values such as size, strength or weight (basic weight) are resultantly forced to use the apparatus with performance lower than performance to be provided originally.

(Problem in Conventional Technology)

For compensating for the performance degradation of the ACS function under the above present situation, the correction processing is conventionally performed by focusing on a color deviation amount between channels of the reading device in the scanner (for example, between three channels of RGB). First, the color deviation amount will be calculated as follows.

Figure 14:
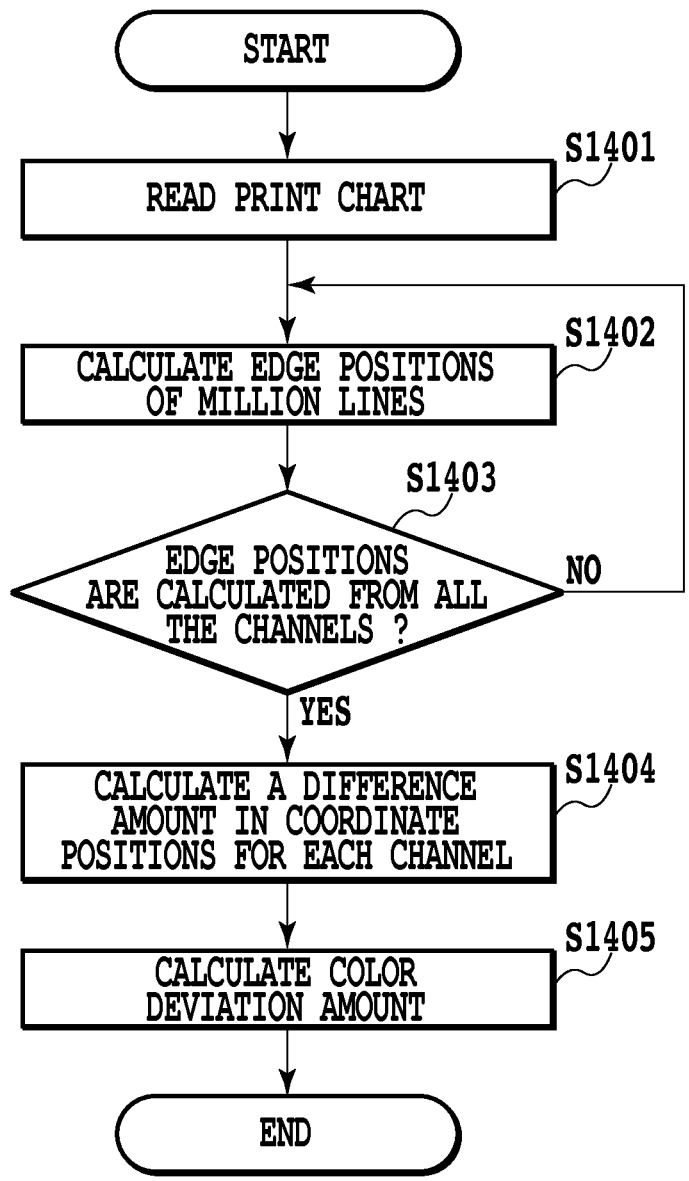
FIG. 14 is a flow chart showing a flow of the processing for calculating the color deviation amount.

FIG. 14 is a flow chart showing a flow of the processing for calculating the color deviation amount.

Figure 12:
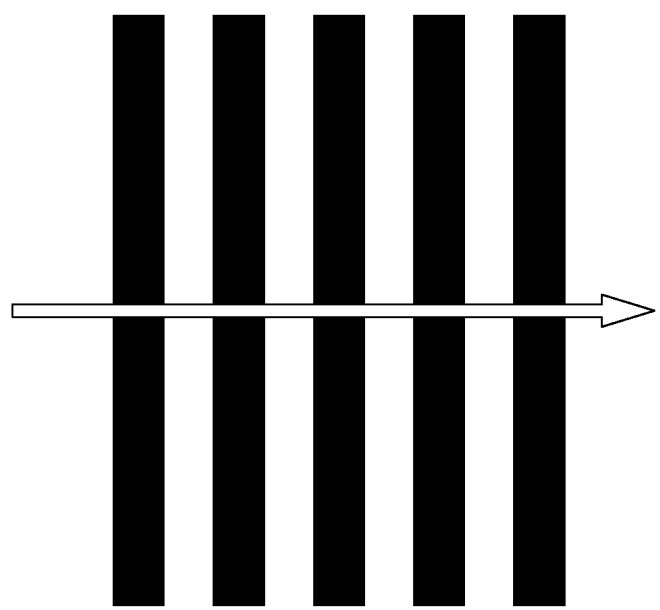
FIG. 12 is a diagram showing an example of a print chart.

At step 1401, the CPU 113 reads a print chart by the scanner. The print chart is a chart printed in monochrome as shown in FIG. 12, and is constituted by parallel lines (million lines) lined up regularly closely. The million lines are printed, for example, by intervals of 4 plm (Line/mm). The scanner scans the million lines in a vertical direction to read an image data.

Figure 13:
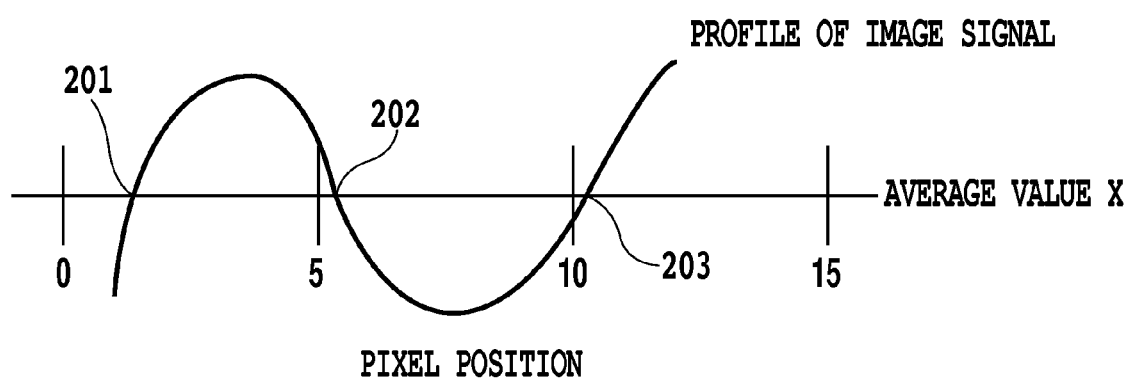
FIG. 13 is a diagram showing an example of edge positions of million lines calculated for each channel.

Next, at step 1402, the CPU 113 calculates edge positions of the million lines for each channel from the read image data. Specially, for example, there are calculated points where an average value X of all pixels obtained by sampling on a line shown in an arrow mark of FIG. 12 intersects with an image signal profile successive on the arrow mark. The calculated edge positions are expressed by decimal point, for example, as shown in FIG. 13. In FIG. 13, number 201 shows 1.30, number 202 shows 5.40 and number 203 shows 10.50 as numerical coordinates.

At step 1403, it is determined whether or not edge positions of the million lines in regard to all the channels of RGB are calculated, and in a case where all the edge positions are calculated, the process goes to step 1404.

At step 1404, the CPU 113 calculates a difference amount of the coordinate position intersected with the average value X between the channels.

At step 1405, the CPU 113 calculates a color deviation amount from the difference amount of the obtained coordinate position between the channels. The content of the processing at step 1405 will be explained with reference to a specific example.

First, it is assumed that the coordinate positions are obtained as follows.

R: 1.30, 5.40, 10.50
G: 1.20, 5.25, 10.40
B: 1.10, 5.20, 10.40

Here, focusing on the channels of R and B, the difference amounts of the coordinates at three locations therebetween are respectively shown as 0.20 (1.30-1.10), 0.20 (5.40-5.20) and 0.10 (10.50-10.40).

An average value of these values becomes 0.17, and this value is a value expressing how much the same monochrome edge is deviated between the channels at the time of reading it, that is, shows a color deviation amount (unit: pixel). The calculated color deviation amount is stored in a memory unit (not shown) for retaining.

The color deviation amount can be theoretically one or more pixels, but since such a scanner does not achieve a normal performance any longer, the color deviation amount is substantially less than 1.0 (pixel) at a maximum.

It should be noted that a series of the processing of calculating the color deviation amount as described above is performed by executing a color deviation amount calculation program stored in the memory unit (not shown) with the CPU 113. The calculated color deviation amount is separately stored in the memory unit for retaining.

The color deviation due to the reading device of the scanner is regularly generated, and correction in phase at the image processing or correction of reading timing of the reading device is made in such a manner that the color deviation amount becomes zero. On the other hand, the color deviation due to the carrier portion is accidentally generated, and it is designed for the color blur to be in an achromatic color by measuring an amount of chromaticity in color blur depending on a magnitude of the color deviation amount. Therefore, the performance degradation of the ACS function can be compensated for to some degrees.

However, the cause of generating the color blur at the edged portion in the black character or line drawing is not necessarily the color deviation alone. Particularly in regard to the color blur at the edge portion accidentally generated due to the carrier portion, a difference in space frequency response (hereinafter, referred to as MTF (Modulation Transfer Function) between channels of RGB is also a large cause.

For example, the reading device such as a CCD sensor is configured by three line sensors respectively covered with color filters of R, G and B. The three line sensors are arranged in parallel with each other, and an interval which is integral times as wide as a line width exists between the sensors. Therefore, a reading delay corresponding to an amount between the lines is corrected between the channels in use of the reading device.

In a case where the three line sensors read edge portions in the order of R, G and B in a feeding direction, it is assumed that an accidental color deviation is generated in a moment R channel is reading the edge portion. Even in this case, there are some cases where B channel reading an edge in a several-line delay has no influence by the color deviation. Even if the influence of the color deviation occurs, since the time difference exists between R and B, a color deviation amount to be generated differs between them. In this way, in a case where the color blur is generated at the edge by the accidental color deviation, when a difference in MTF between channels (for example, R and G) is large, the chromaticity in the color blur generated at the color deviation becomes large. In reverse, even if the accidental color deviation is generated, the difference in MTF between the channels is sufficiently small, the color blur at the edge portion due to the accidental color deviation is restricted. On the other hand, even if the color deviation amount is small, in a case where the difference in MTF between the channels is large, the color blur results in being generated. It should be noted that for convenience of explanation, hereinafter, the difference in MTF between the channels is called "color-to-color MTF difference".

Prediction of the generation frequency of the accidental color deviation and the color deviation amount generated at this time is difficult, but on the other hand, since the color-to-color MTF difference is a value specific to the scanner, it is possible to in advance predict it for each scanner. Therefore, the present invention uses the color-to-color MTF difference which is predictable and the value specific to the scanner to enhance performance of the auto color selection processing.

(Color-to-Color MTF Difference)

The color-to-color MTF difference will be in detail explained before explaining a method of enhancing the performance of the auto color selection processing using the color-to-color MTF difference.

First, for exact calculation of MTF which is a response characteristic for each frequency, it is necessary to use a sine wave, but regularly the calculation is simply made using million lines corresponding to each of the space frequencies. That is, it is general to calculate the MTF by reading plural black million lines corresponding to the respective space frequencies with the scanner.

However, in the present embodiment, the calculation of the MTF is further simplified to calculate a response characteristic in a specific space frequency, which is defined as MTF and then, the color-to-color MTF difference for each channel is calculated.

Figure 15:
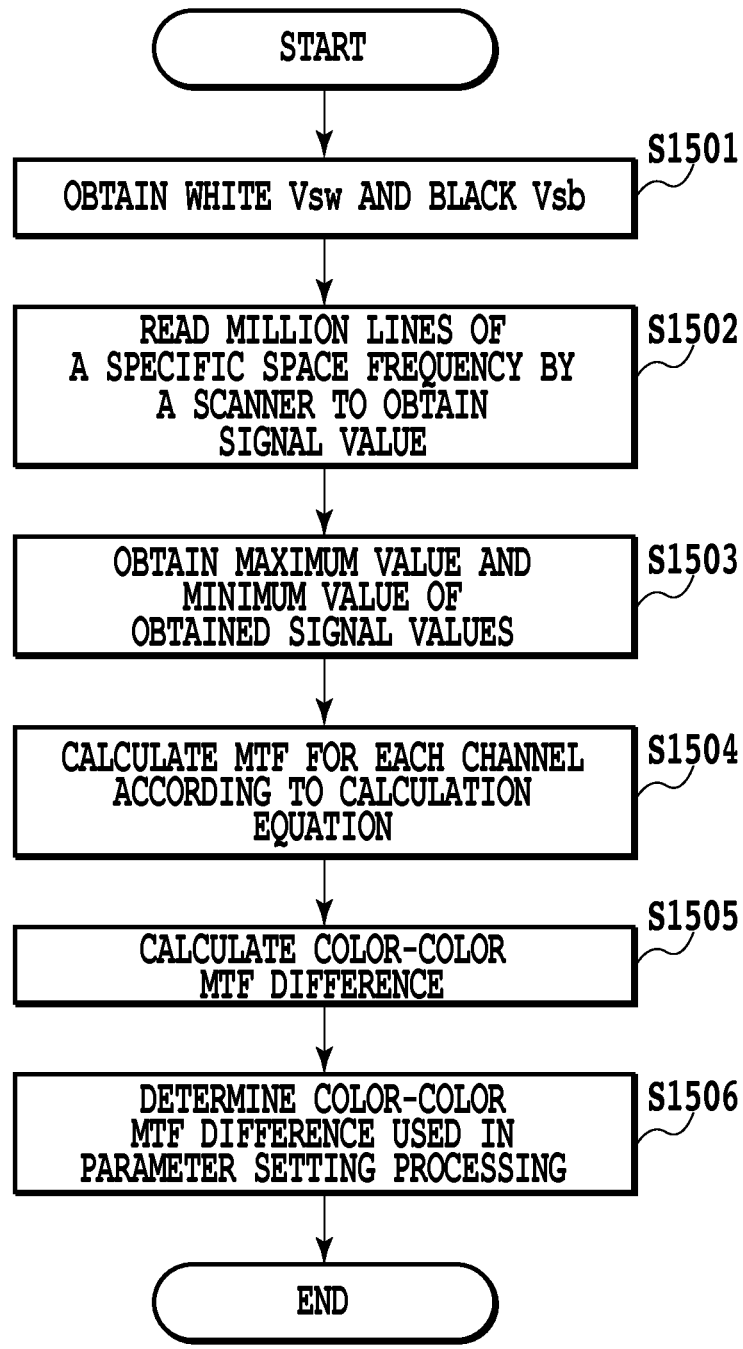
FIG. 15 is a flow chart showing a flow of the processing for calculating the color-to-color MTF difference.

FIG. 15 is a flow chart showing a flow of the processing for calculating the color-to-color MTF difference.

First, at step 1501, the CPU 113 obtains white Vsw using a background color of a sheet as a reference and black Vsp using as a reference a color of ink used for printing a patch having a sufficiently wide area. The white Vsw can be obtained by reading a completely white sheet with the scanner, and the black Vsb can be obtained by reading a completely black sheet with the scanner. Respectively the white Vsw becomes a value of, for example, 250 and the black Vsb becomes a value of, for example, 5.

At step 1502, the CPU 113 reads million lines of a specific space frequency n to obtain signal values. It should be noted that the space frequency n can be arbitrarily set, but, for example, in a case of considering a sharpness of small characters, it is appropriate that the space frequency n is the order of 150 to 200 lines (line/inch).

Next, at step 1503, the CPU 113 obtains values of the maximum value VnMax and the minimum value VnMin in the signal values read at the million line unit. Here, VnMax and VnMin are the values within a range of 0 to 255, and, for example, values of 220 (Vnmax) and 20 (VnMin).

At step 1504, the CPU 113 applies the obtained white Vsw, black Vsb, maximum value VnMax and minimum value VnMin for the following calculating equation to obtain MTF as the response characteristic at the space frequency n.

$$MTF=(V_n\text{Max}-V_n\text{Min})/(\text{white } V_{sw}-\text{black } V_{sb})$$

For example, MTF in the above exemplified numerical values:

$$(220-20)/(250-5)=0.816$$

when the MTF in the specific space frequency n is calculated for each channel, the process goes to step 1505.

At step 1505, the CPU 113 calculates a color-to-color MTF difference from the calculated MTF.

For example, in a case where the space frequency is 150 lines, it is assumed that in regard to the MTF in each channel of R, G and B, 0.8 in R, 0.7 in G and 0.6 in B are calculated. In this case, 0.1 (0.8–0.7) is calculated as the color-to-color MTF difference between R and G, 0.1 (0.8–0.7) is calculated as the color-to-color MTF difference between G and B, and 0.2 (0.8–0.6) is calculated as the color-to-color MTF difference between R and B.

Finally at step 1506, the CPU 113 determines a color-to-color MTF difference used for parameter setting processing to be described later from the calculated color-to-color MTF differences. In regard to a reference for the determination, it is considered to select the maximum color-to-color MTF difference or an average value of the calculated color-to-color MTF differences. Further, color-to-color MTF differences may be calculated in regard to plural space frequencies n respectively and the maximum value or the averaging value out of them may be obtained. In the above examples, in a case where the reference for the determination, is "selection of the maximum color-to-color MTF difference", 0.2 is determined as the color-to-color MTF difference. It should be noted that a series of the processing in regard to the MTFs as described above is performed by executing the color-to-color MTF difference calculation program stored in the memory unit (not shown) with the CPU 113. The value of the color-to-color MTF difference determined at step 1506 is separately stored in the memory unit for retaining, for use in the parameter setting processing to be described later.

(Parameter Setting Processing)

Figure 7:
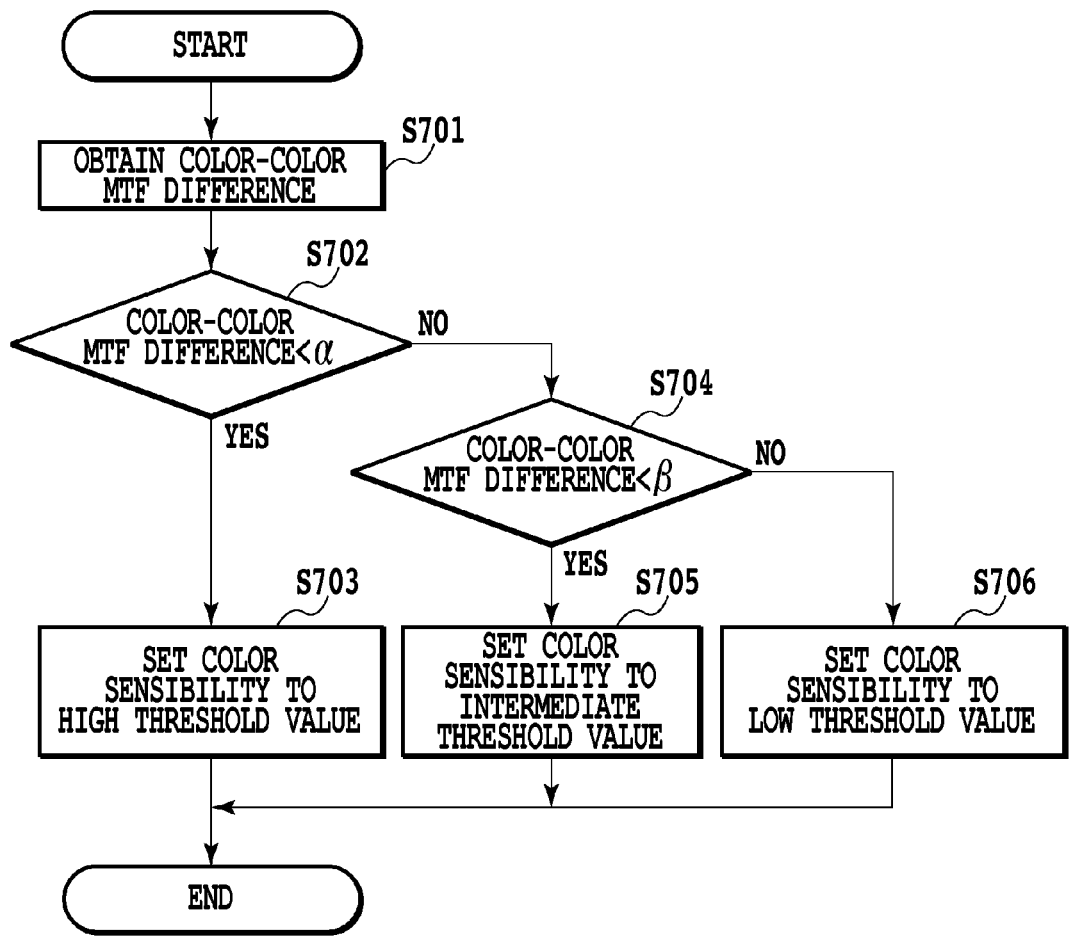
FIG. 7 is a flow chart showing a flow of the processing for setting parameters in a color determination circuit according to a first embodiment.

In the present invention, the color-to-color MTF difference obtained as described above is used for the auto color selection processing. In a first embodiment, the color-to-color MTF difference is used to set a threshold value as a parameter of the color determination circuit 202 in the auto color selection processing. Hereinafter, the processing of setting the threshold value of the color determination circuit 202 according to the first embodiment will be explained with reference to a flow chart in FIG. 7.

First, the CPU 113 in the image processing apparatus obtains the value of the color-to-color MTF difference stored in the memory unit (not shown).

At step 702, the CPU 113 compares the obtained value of the color-to-color MTF difference with a predetermined value $\alpha$. Here, the predetermined value is a value as a reference of the color-to-color MTF difference for identifying color determination sensibility which prevents occurrence of erroneous determination at the auto color selection processing. In the present embodiment, since the color determination sensibility is divided into three levels of high, intermediate and low, two values of $\alpha$ and $\beta$ are in advance set by a user. $\alpha$ and $\beta$ of the predetermined values have a relation of "$\alpha<\beta$", and as a result, as the value of the color-to-color MTF difference is the smaller, the color determination sensibility is set the higher. At step 702, in a case where the value of the color-to-color MTF difference is smaller than the predetermined value $\alpha$, the process goes to step 703. On the other hand, the value of the color-to-color MTF difference is larger than the predetermined value $\alpha$, the process goes to step 704.

At step 703, the CPU 113 sets a threshold value to the color determination circuit 202 in the color determination processing unit 111 in such a manner that the color determination sensibility is high. That is, in an example of FIG. 3, a radius (for example, r=0.025) of a circle is set as the threshold value such that the circular hatched region 304 is small.

At step 704, the CPU 113 compares the obtained value of the color-to-color MTF difference with a predetermined value $\beta$. In a case where the value of the color-to-color MTF difference is smaller than the predetermined value $\beta$, the process goes to step 705. On the other hand, the value of the color-to-color MTF difference is larger than the predetermined value $\beta$, the process goes to step 706.

At step 705, the CPU 113 sets a threshold value to the color determination circuit 202 in the color determination processing unit 111 in such a manner that the color determination sensibility is intermediate. That is, in an example of FIG. 3, a radius (for example, r=0.05) of a circle is set as the threshold value such that the circular hatched region 304 is larger than that set at step 703.

At step 706, the CPU 113 sets a threshold value to the color determination circuit 202 in the color determination processing unit 111 in such a manner that the color determination sensibility is small. That is, in an example of FIG. 3, a radius (for example, r=0.1) of a circle is set as the threshold value such that the circular hatched region 304 is larger than that set at step 705.

Assuming that the respective predetermined values of $\alpha$ and $\beta$ are 0.1 and 0.3, and the value of the color-to-color MTF difference is 0.2, the threshold value is supposed to be set to the color determination circuit 202 in such a manner that the color determination sensibility is intermediate.

As described above, when the setting of the threshold value to the color determination circuit 202 in the color determination processing unit 111 is completed, the processing ends.

It should be noted that in the above example, two values of $\alpha$ and $\beta$ are set as the predetermined values and the three levels of high, intermediate and low are set as the kinds of the color determination sensibility set to the color determination circuit 202, but the present invention is not limited thereto. For example, four values may be set as the predetermined values and five levels may be set as the kinds of the color determination sensibility. An increase in the kind of the color determination sensibility enables setting of more accurate color determination sensibility suitable for performance of an individual scanner.

Further, the present embodiment has explained a case where all the processing is performed inside the image processing apparatus, but a series of the processing including the calculation of the MTF may be performed in an apparatus separated from the image processing apparatus. In this case, a parameter (threshold value) determined in the separate apparatus outside the image processing apparatus is taken in the image processing apparatus through an external I/F (not shown) and is set to the color determination circuit 202.

As described above, determining the parameter of the color determination circuit 202 corresponding to the value of the color-to-color MTF difference enables the performance of the ACS function to be adjusted. In addition, since the threshold value is set corresponding to the performance of the individual scanner, a MFP equipped with the scanner with high reading accuracy can provide the ACS function effecting that function.

Second Embodiment

The first embodiment focuses on the color-to-color MTF difference as the specific characteristic for each reading device and sets the parameter (threshold value) used in the color determination circuit 202 corresponding to the calculated value of the color-to-color MTF difference to optimize the performance of the ACS function. The second embodiment will explain a case using not only the color-to-color MTF difference but also the color deviation amount for determination on the threshold value used in the color determination circuit 202.

Figure 9:
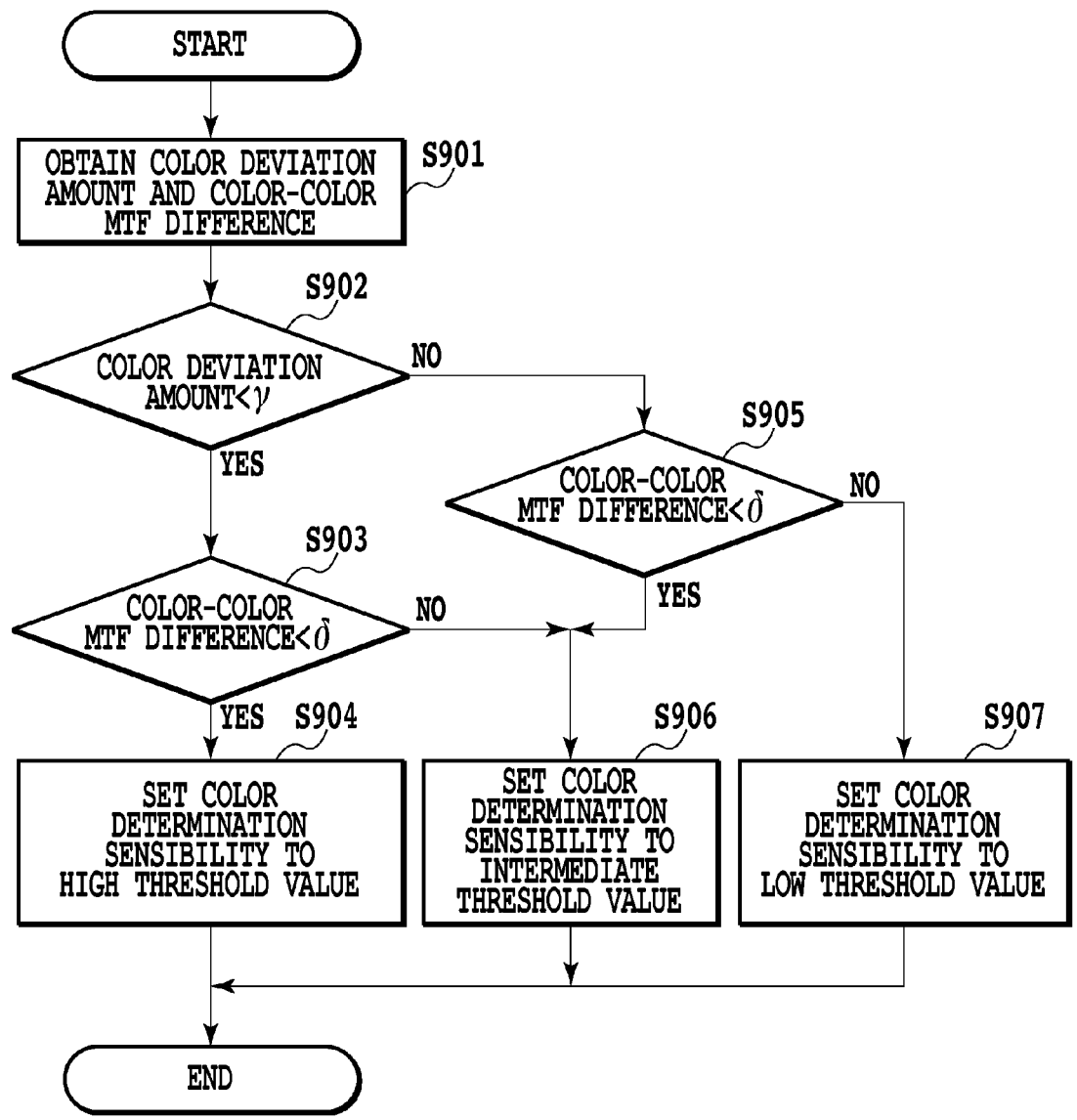
FIG. 9 is a flow chart showing a flow of the processing for setting parameters in a color determination circuit according to a second embodiment.

FIG. 9 is a flow chart showing a flow of the processing of setting a threshold value of the color determination circuit 202 according to the present embodiment. Hereinafter, the present embodiment will be in detail explained based upon the flow chart, but parts in common with those of the flow chart in FIG. 7 according to the first embodiment will be simplified or omitted and here, different points from the first embodiment will be mainly explained.

First, at step 901, the CPU 113 in the image processing apparatus obtains values of the color deviation amount and the color-to-color MTF difference which are stored in the memory unit (not shown). It should be noted that here, the color deviation amount and the color-to-color MTF difference obtained from the memory unit are calculated before the present processing as similar to a case of the first embodiment. That is, the color deviation amount and the color-to-color MTF difference are obtained by in advance executing a color deviation amount calculation program and a color-to-color MTF difference calculation program.

First, at step 902, the CPU 113 compares the obtained value of the color deviation amount with a predetermined value $\gamma$.

Here, the predetermined value γ is a value (for example, 0.3 (pixel) as a reference of the color deviation amount for identifying color determination sensibility which prevents generation of erroneous determination at the auto color selection processing. The predetermined value is in advance set by a user and is regularly a value of 1.0 or less (pixel). In a case where the obtained value of the color deviation amount is less than the predetermined value γ, the process goes to step 903, and in a case where the obtained value of the color deviation amount is larger than the predetermined value γ, the process goes to step 905.

At step 903, the CPU 113 compares the obtained value of the color-to-color MTF difference with a predetermined value δ. In this case, the predetermined value δ is similar in kind to α or β in the first embodiment, and is any value in advance set by a user. In a case where the value of the color-to-color MTF difference is smaller than the predetermined value δ, the process goes to step 904, wherein the threshold value is set to the color determination circuit 202 such that the color determination sensibility is high, and in a case where the value of the color-to-color MTF difference is larger than the predetermined value δ, the process goes to step 906, wherein the threshold value is set to the color determination circuit 202 such that the color determination sensibility is intermediate.

At step 905 also, the processing similar to step 903 is performed. That is, In a case where the value of the color-to-color MTF difference is smaller than the predetermined value δ, the process goes to step 906, wherein the threshold value is set to the color determination circuit 202 such that the color determination sensibility is intermediate, in a case where the value of the color-to-color MTF difference is larger than the predetermined value δ, the process goes to step 907, wherein the threshold value is set to the color determination circuit 202 such that the color determination sensibility is low.

That is, in the present embodiment, in a case where the values of the color deviation amount and the color-to-color MTF difference both are small, the threshold value (first threshold value) is set to the color determination circuit 202 such that the color determination sensibility is high. On the other hand, in a case where the value of the color deviation amount is small, but the value of the color-to-color MTF difference is not small or in a case where the value of the color deviation amount is not small, but the value of the color-to-color MTF difference is small, the threshold value (second threshold value) is set to the color determination circuit 202 such that the color sensibility is intermediate. In a case where the values of the color deviation amount and the color-to-color MTF difference both are not small, the threshold value (third threshold value) is set to the color determination circuit 202 such that the color determination sensibility is low.

Figure 11:
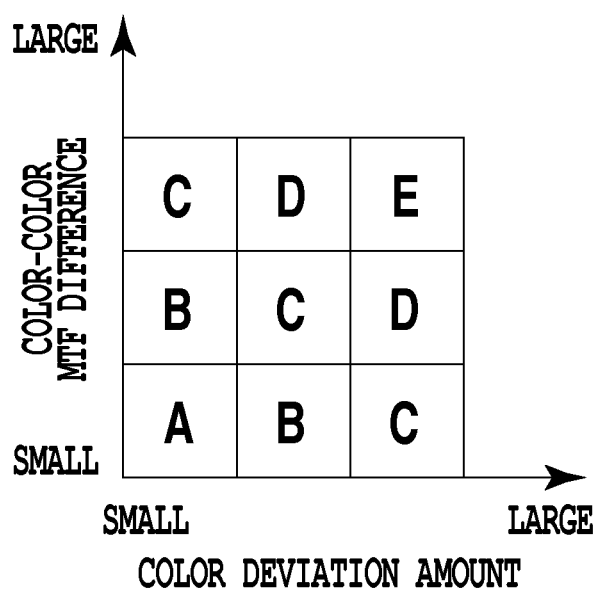
FIG. 11 is a graph showing a relation between a color-to-color MTF difference and a color deviation amount according to the second embodiment.

It should be noted that in addition to the aforementioned method, a graph as shown in FIG. 11 may be used, for example. FIG. 11 is the graph in which the color-to-color MTF difference is expressed as a vertical axis and the color deviation amount is expressed as a lateral axis. Values of A to E as threshold values are allotted respectively to nine divided regions of the graph. Here, each value of A to E has a relation of "A<B<C<D<E", wherein in a case of A value, the color determination sensibility is the highest and in a case of E value, the color determination sensibility is the lowest. As apparent from FIG. 11, a case where the threshold value E as to provide the lowest color determination sensibility is set to the color determination circuit 202 is only a case where the color deviation amount and the color-to-color MTF difference both are large. For example, in a case where the color deviation amount is large, but the color-to-color MTF difference is small, the threshold value to be set is a value of C such that the color determination sensibility is intermediate.

In this way, by using both of the color deviation amount and the color-to-color MTF difference, it is possible to set the threshold value more finely corresponding to the characteristic of the reading device to effect the performance of the ACS function at a maximum.

Third Embodiment

The first and second embodiments have explained a case of using the color-to-color MTF difference for setting the parameter of the color determination circuit 202 at the color determination processing unit 111. Next, the third embodiment will explain a case using the color-to-color MTF difference for setting a parameter in the auto color selection processing unit 112, that is, a case using the color-to-color MTF difference for setting a pattern of a pixel group used at the time of extracting a chromatic color group from an image data.

Figure 8:
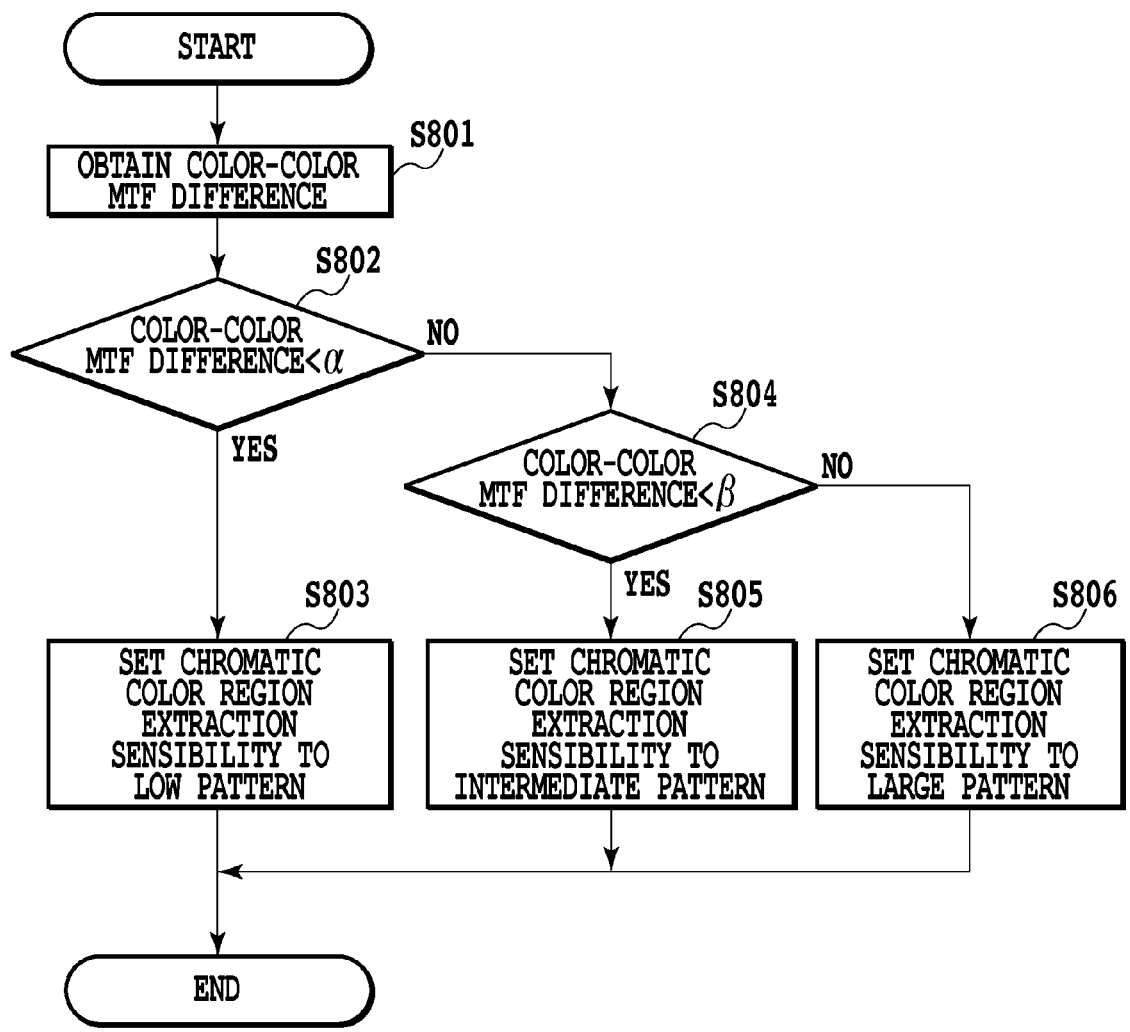
FIG. 8 is a flow chart showing a flow of the processing for setting parameters in a color selection processing unit according to a third embodiment.
Figure 10:
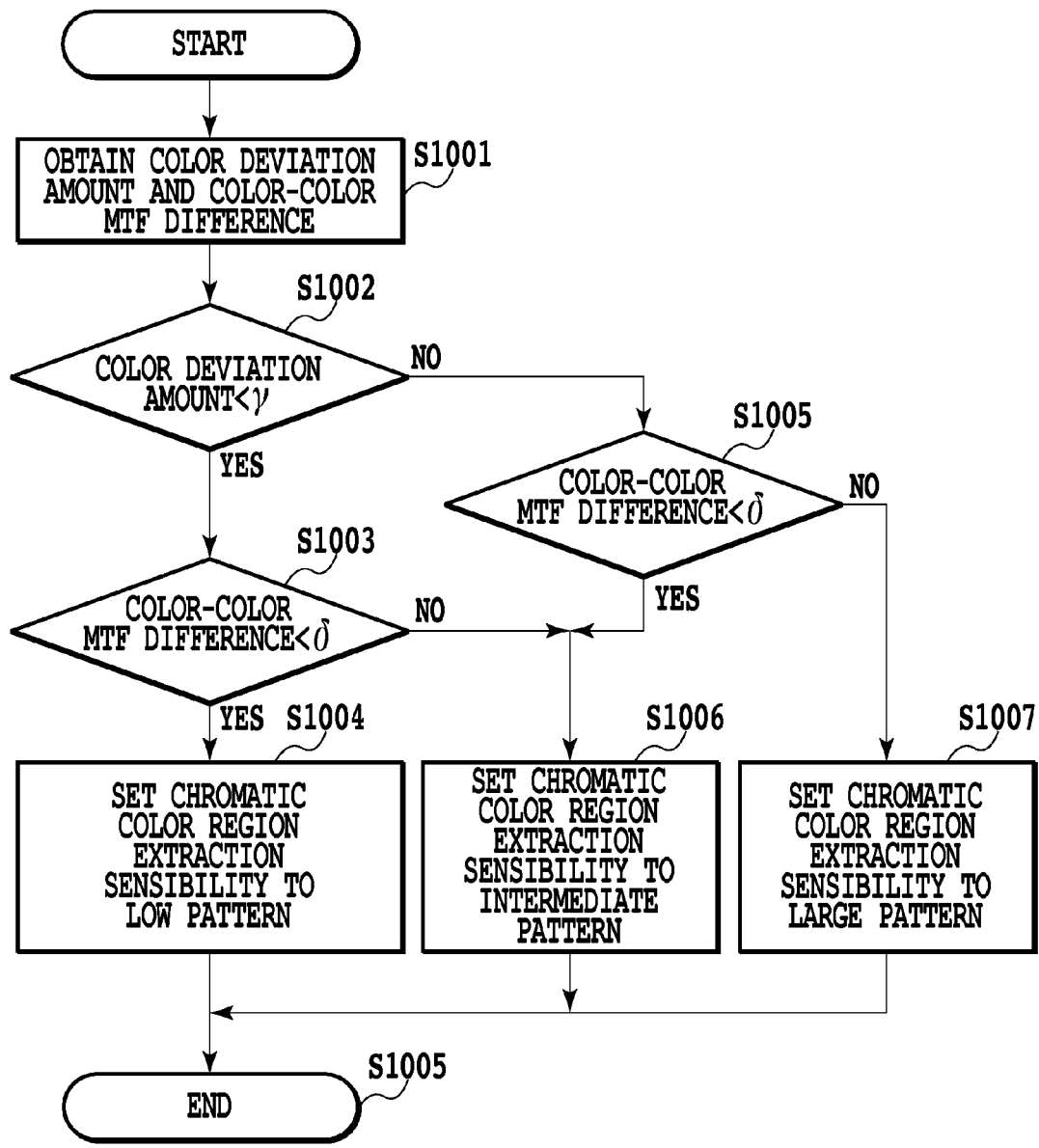
FIG. 10 is a flow chart showing a flow of the processing for setting parameters in the color selection processing unit according to the third embodiment.

FIG. 8 and FIG. 10 are flow charts each showing a flow of the processing of setting the pattern 421 for chromatic color determination of the auto color selection processing unit 112 in the present embodiment. FIG. 8 and FIG. 10 respectively correspond to the flow charts in FIG. 7 and FIG. 9 according to the first embodiment. Since a large part of the flow charts are in common with that in FIG. 7 and FIG. 9 according to the first embodiment, hereinafter different points from the first and second embodiments will be mainly explained.

First, in a case of the flow chart shown in FIG. 8, only the color-to-color MTF difference is used for setting the pattern 421 for chromatic color determination. Steps 801, 802 and 804 are the same processing as steps 701, 702 and 704, and therefore, an explanation thereof is omitted.

At steps 803, 805 and 806, the CPU 113 sets the pattern 421 for chromatic color determination in the auto color selection processing unit 112 so as to produce a targeted chromatic color region extraction sensibility. Specially at step 803, the pattern 421 is set to a small pattern in which the number of constituting pixels is small such that the extraction sensibility in the chromatic color region is high. At step 805, the pattern 421 is set to an intermediate-sized pattern in which the number of constituting pixels is usual such that the extraction sensibility in the chromatic color region is intermediate. At step 806, the pattern 421 is set to a large pattern in which the number of constituting pixels is large such that the extraction sensibility in the chromatic color region is low.

Further, in a case of using both of the color deviation amount and the color-to-color MTF difference for changing the pattern 421 for chromatic color determination, the processing is performed according to the flow chart in FIG. 10. In regard to contents of the respective steps in FIG. 10, steps 1001 to 1003 and 1005 correspond to steps 901 to 903 and 905 in FIG. 9, and steps 1004, 1006 and 1007 correspond to steps 803, 805 and 806 in FIG. 8. Therefore, an explanation thereof is omitted.

As described above, according to the present embodiment, the pattern for chromatic color determination used in the matching processing at the color selection processing unit 112 can be optimally set corresponding to the performance of the reading device.

Fourth Embodiment

In the first to third embodiments, it is desirable that in a case a position where the accidental color deviation is generated at the reading by the scanner can be specified, the color deviation amount or the color-to-color MTF difference measured at that position is used.

The accidental color deviation originally tends to be easily generated in an auto document feeder (ADF) (not shown) installed in the reading device of the scanner. Since a document for reading is automatically fed in the ADF, guides, carrier rollers and the like exist in the sheet carriage route. When a shock, which is generated in a moment the guide or roller bumps against a sheet or the sheet is out of the guide or roller, is transmitted to the reading device, the color deviation is frequently generated. Particularly when the sheet is heavy or rigid, the shock to be generated becomes large. In addition, since the guides or rollers are arranged by given intervals, as the sheet size is smaller, the sheet is more frequently out of the guide or roller. As a result, the shock tends to be easily generated.

Therefore, in a case a location where the generation frequency of the color deviation is high can be specified, it is effective to use the color deviation amount or the color-to-color MTF difference measured at that position. Accordingly, since the performance of the reading device is determined based upon the value measured at a location where the color deviation tends to be easily generated, accuracy of the threshold value set in the color determination circuit 202 is also finally improved.

In addition, it is desirable that the value of the color deviation amount or color-to-color MTF difference is obtained by reading a chart describing a specific pattern in the adjustment process or the like at scanner assembling which will be stored in the memory unit (not shown). Further, it is desirable that at replacement of the reading device in the scanner by a service man, the similar operation is made. In addition, it is desirable that in a case where the adjustment is difficult, the value of the color deviation or color-to-color MTF difference is described in a replacement component, and a service man can set the value at replacement.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example, via a network os from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232492, filed Oct. 6, 2009, which is hereby incorporated by reference herein in its entirety.

What is claimed is:

1. An apparatus for setting a parameter used at the time an image processing apparatus determines whether an image data read by an image reading apparatus is a colored image or a monochrome image, to the image processing apparatus, comprising:

a unit configured to obtain a reading characteristic of the image reading apparatus; and a parameter setting unit configured to set the parameter corresponding to the obtained reading characteristic, wherein the image processing apparatus includes a color determination unit configured to determine whether each pixel of the image data is a chromatic color or an achromatic color, wherein the parameter is a threshold value used at the time the color determination unit determines whether the each pixel of the image data is the chromatic color or the achromatic color, wherein the reading characteristic is a difference in MTF between channels of the image reading apparatus, and wherein the MTF is an index indicating a difference between a maximum signal value and a minimum signal value obtained by reading a million lines having a specific space frequency being divided by a difference between a signal value obtained by reading a completely black sheet and a signal value obtained by reading a completely white sheet.

2. An apparatus according to claim 1, wherein the parameter setting unit sets the parameter to the threshold value by which each pixel tends to be more easily determined as the achromatic color as the difference in MTF between the channels is the smaller.

3. An apparatus according to claim 1, wherein
the reading characteristic is a difference in MTF and a color deviation amount between channels in the image reading apparatus.

4. An apparatus according to claim 1, wherein
the parameter setting unit includes a comparing unit configured to compare each of the obtained difference in MTF and the obtained color deviation amount between the channels with a predetermined value corresponding to the each, wherein the comparing unit sets:

a first threshold value in a case where the color deviation amount is smaller than the predetermined value and the difference in MTF between the channels is smaller than the predetermined value;

a second threshold value in a case where the color deviation amount is smaller than the predetermined value and the difference in MTF between the channels is larger than the predetermined value or the color deviation amount is larger than the predetermined value and the difference in MTF between the channels is smaller than the predetermined value;

a third threshold value in a case where the color deviation amount is larger than the predetermined value and the difference in MTF between the channels is larger than the predetermined value; and each pixel tends to be more easily determined as the achromatic color in the order of the first threshold value, second threshold value and third threshold value.

5. An apparatus according to claim 1, wherein
the image processing apparatus comprises a color selection unit configured to calculate an appearance frequency of a pixel group in a chromatic color from the image data,
the parameter is a pattern of a pixel group used at the time of extracting the pixel group in the chromatic color from the image data in the color selection unit, and
the reading characteristic is a difference in MTF between channels of the image reading apparatus.

6. A method of setting a parameter used at the time an image processing apparatus determines whether an image data read by an image reading apparatus is a colored image or a monochrome image, to the image processing apparatus, the method comprising the steps of:

obtaining a reading characteristic of the image reading apparatus; and setting the parameter corresponding to the obtained reading characteristic, wherein the image processing apparatus includes a color determination unit configured to determine whether each pixel of the image data is a chromatic color or an achromatic color, wherein the parameter is a threshold value used at the time the color determination unit determines whether the each pixel of the image data is the chromatic color or the achromatic color, wherein the reading characteristic is a difference in MTF between channels of the image reading apparatus, and wherein the MTF is an index indicating a difference between a maximum signal value and a minimum signal value obtained by reading a million lines having a specific space frequency being divided by a difference between a signal value obtained by reading a completely black sheet and a signal value obtained by reading a completely white sheet.

7. A non-transitory computer readable storage medium storing a program for carrying out a method of setting a parameter used at the time an image processing apparatus determines whether an image data read by an image reading apparatus is a colored image or a monochrome image, to the image processing apparatus, the method comprising the steps of:

obtaining a reading characteristic of the image reading apparatus; and setting the parameter corresponding to the obtained reading characteristic, wherein the image processing apparatus includes a color determination unit configured to determine whether each pixel of the image data is a chromatic color or an achromatic color, wherein the parameter is a threshold value used at the time the color determination unit determines whether the each pixel of the image data is the chromatic color or the achromatic color, wherein the reading characteristic is a difference in MTF between channels of the image reading apparatus, and wherein the MTF is an index indicating a difference between a maximum signal value and a minimum signal value obtained by reading a million lines having a specific space frequency being divided by a difference between a signal value obtained by reading a completely black sheet and a signal value obtained by reading a completely white sheet.

* * * * *